US006130426A

United States Patent [19]

Laukien et al.

[11] Patent Number: 6,130,426

[45] Date of Patent: Oct. 10, 2000

[54] KINETIC ENERGY FOCUSING FOR PULSED ION DESORPTION MASS SPECTROMETRY

[75] Inventors: Frank H. Laukien, Lincoln, Mass.; Melvin A. Park, Nashua, N.H.

[73] Assignee: Bruker Daltonics, Inc., Billerica, Mass.

[21] Appl. No.: 09/032,510

[22] Filed: Feb. 27, 1998

[51] Int. Cl.[7] .............................. B01D 59/44; H01J 49/00

[52] U.S. Cl. .......................... 250/287; 250/282; 250/292

[58] Field of Search .................................... 250/282, 287, 250/292, 288

[56] References Cited

U.S. PATENT DOCUMENTS

| | | | |
|---|---|---|---|
| 5,504,326 | 4/1996 | Reilly et al. | 250/287 |
| 5,625,184 | 4/1997 | Vestal et al. | 250/287 |
| 5,627,369 | 5/1997 | Vestal et al. | 250/287 |
| 5,641,959 | 6/1997 | Holle et al. | 250/287 |
| 5,760,393 | 6/1998 | Vestal et al. | 250/282 |
| 5,828,063 | 10/1998 | Koster et al. | 250/288 |
| 5,854,486 | 12/1998 | Dreyfus | 250/288 |

*Primary Examiner*—Bruce C. Anderson
*Attorney, Agent, or Firm*—Ward & Olivo

[57] ABSTRACT

The present invention relates to a means and method for decreasing the energy distribution of ions produced from solid or liquid samples by pulsed desorption method. More particularly, the present invention discloses a method wherein the kinetic energies of ions are related to their locations at a given time after the excitation event which caused their desorption. Based on this relationship between ion position and energy, an accelerating electric field is applied at a predetermined time after the excitation event. The magnitude of the applied electric field and the time of its application are such that the kinetic energy distribution of the ions is substantially reduced or eliminated.

31 Claims, 2 Drawing Sheets

KINETIC ENERGY FOCUSING FOR PULSED ION DESORPTION MASS SPECTROMETRY

TECHNICAL FIELD OF THE INVENTION

The present invention relates to a means and method for decreasing the energy distribution of ions produced from solid or liquid samples by pulsed desorption methods. More particularly, the present invention discloses a method wherein the kinetic energies of ions are related to their locations at a given time after the excitation event which caused their desorption. Based on this relationship between ion position and energy, an accelerating electric field is applied at a predetermined time after the excitation event. The magnitude of the applied electric field and the time of its application is such that the kinetic energy distribution of the ions is substantially reduced or eliminated.

BACKGROUND OF THE INVENTION

This invention relates in general to ion beam handling in mass spectrometers and more particularly to a means of focusing ions in time-of-flight mass spectrometers (TOFMS). The apparatus and method of mass analysis described herein is an enhancement of the techniques that are referred to in the literature relating to mass spectrometry.

The analysis of ions by mass spectrometers is important, as mass spectrometers are instruments that are used to determine the chemical structures of molecules. In these instruments, molecules become positively or negatively charged in an ionization source and the masses of the resultant ions are determined in vacuum by a mass analyzer that measures their mass/charge (m/z) ratio. Mass analyzers come in a variety of types, including magnetic field (B), combined (double-focusing) electrical (E) and magnetic field (B), quadrupole (Q), time-of-flight (TOF) mass analyzers, quadrupole ion storage trap, and, fourier transform ion cyclotron resonance (FT-ICR) mass analyzers, which are of particular importance with respect to the invention disclosed herein. Each mass spectrometric method has a unique set of attributes. Thus, trap and analyze type of mass spectrometers such as Fourier Transform Ion Cyclotron Resonance Mass Spectrometry (FT-ICR MS) arose out of the evolution of the larger field of mass spectrometry.

A number of ion sources can and are used in conjunction with trap-and-analyze mass spectrometers. Included among these is matrix assisted laser desorption/ionization (MALDI). The MALDI ion source has its origins in a work performed by M. Karas et al. in 1985 (M. Karas, D. Bachmann, F. Hillenkamp, *Anal. Chem.* 57, 2935(1985)). The observations of that work were developed into the MALDI method as described in later articles (M. Karas, F. Hillenkamp, *Anal. Chem.* 60,2301(1988)). When analyzing ions by MALDI-MS, sample is dissolved in a matrix of organic acid crystals. A laser is used to excite the organic acid matrix so that it sublimes into the vacuum of the mass spectrometer. It is important to note that the laser light used to excite the matrix is of a wavelength that the sample molecules do not absorb it. Thus, the sample molecules remain relatively cool throughout the desorption/ionization process. Also, the laser pulse used to excite the matrix is generally very short. Typically, the laser pulse duration is on the order of a few nanoseconds.

As the excited matrix sublimes, sample molecules are ejected into the vacuum as well. In the resulting plume, sample molecules can be ionized by, for example, proton transfer from the excited matrix molecules. In this way, MALDI can be used to produce ions from high molecular weight labile compounds such as proteins and other biological molecules (Hercules et al., *Anal. Chem.* 63, 450(1991)).

One of the difficulties with interfacing MALDI with mass spectrometry is related to the kinetic energy distribution that the ions have after desorption and ionization. The MALDI process results in the ejection of ions from the solid sample into the vacuum. The ions are ejected with a range of velocities and therefore kinetic energies. This distribution was measured in a work by Beavis and Chait (R. Beavis and B. Chait, *Chem. Phys. Lett.* 181(5), 479(1991)). In that work, Beavis found that all ions regardless of their mass-to-charge ratio have virtually the same velocity distribution. That is, a sample molecule of molecular weight 15,590 Da results in ions having nearly the same velocity distribution as molecules of molecular weight 1030 Da. The observed velocity distribution was centered at about 750 m/s and ranged from roughly 500 m/s to roughly 1000 m/s. This results in an initial ion kinetic energy distribution which is directly proportional to mass. For ions of about 1000 Da (roughly the mass of a peptide) the energy distribution would be on the order of a few eV. For ions of about 10,000 Da (small proteins), however, the energy distribution would be on the order of tens of eV.

MALDI sources have been used with varying degrees of success in conjunction with trap mass spectrometers. In the field of Fourier Transform Ion Cyclotron Resonance Mass Spectrometry (FTICR-MS), for example, a Penning ion trap is used. The conventional Penning trap consists of six metal plates forming a cube in a magnetic field (M. B. Comisarow, *Adv. Mass Spectrom.* 8, 1698(1980); M. B. Comisarow, *Int. J. Mass Spectrom. Ion Phys.* 37, 251(1981)). Two of these plates (trapping plates) reside in planes perpendicular to the magnetic field whereas the other four (the excite/detect electrodes) are in planes parallel to the magnetic field. In conventional FTICR-MS, the trapping plates together with the magnetic field are used to trap ions. To accomplish this, a small electrical potential (e.g. 1 V) is applied to the trapping plates. The remaining plates are held at ground potential. The magnetic field confines ions in the plane perpendicular to the magnetic field line B, the x-y plane, and the electric field produced by the potential difference between the trap electrodes, and the excite/detect electrodes confines the ions along the magnetic field lines B, the z axis. It should be noted that ions from an external ion source, such as MALDI, enter the cell through an aperture in one of the trapping plates and initially are moving mainly along the z axis. Thus, the distribution in initial kinetic energies of the ions from a MALDI or other external ion source is directed along the instrument's z-axis.

In 1992, Wilkins et al. (J. A. Castoro, C. Koester, C. L. Wilkins, *Rapid Commun. Mass Spectrom.* 6, 239(1992)) used an FTICR mass spectrometer in the analysis of various compounds including myoglobin (MW~17,000 Da). To accomplish this they used a gated-trapping technique to decelerate MALDI ions so that they could be trapped in their Penning trap.

Solouki and Russell (T. Solouki, D. Russell, *Proc. Natl. Acad. Sci.* USA 89, 5701(1992)) have demonstrated effective trapping of high kinetic energy ions by using a collisional cooling process used in conjunction with a high trapping voltage. In these studies, MALDI ions were cooled through collisions with inert gas molecules in a small volume chamber before entering the FTMS cell. An electrostatic wire ion guide was also used to position ions along the exact center of the cell. In this way, ions up to 157,000 Da were trapped and detected (T. Solouki, K. J. Gilling, D. H. Russell, *Anal. Chem.* 66, 1583(1994)). However, mass resolution was low.

In 1995, Yao et al. (J. Yao, M. Dey, S. J. Pastor, C. L. Wilkins, *Anal. Chem.* 67, 3638(1995)) used a five-plate trapping method and successfully trapped and analyzed MALDI produced ions up to m/z~66,000 Da. Again, however, mass resolution was poor and deceleration potentials were required for the excite and detect electrodes.

SUMMARY OF THE INVENTION

Ions in a uniform magnetic field, barring other influences, move in circular orbits (cyclotron motion) with a frequency proportional to ion mass-to-charge ratio (A. G. Marshall, L. H. Christopher, G. S. Jackson, *Mass Spectrom. Rev.*, in press, 1998). However, the presence an electrostatic field, such as that produced by the trapping plates, produces new modes of motion (magnetron, and trapping) and alters the frequency of the cyclotron motion of the ions. This reduces the resolution of the spectrometer and causes a distortion in the relationship between ion m/z and cyclotron frequency.

The magnitude of the potentials placed on the trapping electrodes is significant both to the degree to which the cyclotron motion is distorted and to the range of z-axis kinetic energy an ion can have and still be trapped. The kinetic energy of the ions which can be trapped is directly related to the potential on the trapping electrodes, however, so is the distortion on the cyclotron motion. Thus, in a conventional FTICR cell, one would set the potential on the trapping electrodes as a compromise between trapable ion kinetic energy and distortion in cyclotron motion. Because the trapping potential must be kept low (e.g. 1 V), to avoid excessive cyclotron motion distortion, the range of trapable ion kinetic energies is also low (e.g. ~1 eV). This limits the FTMS method in its application to external ion sources such as MALDI because such sources often produce ion beams which have a broad range of kinetic energies (T. W. D. Chan et al., *Chem. Phy. Lett.* 222, 579 (1994); J. A. Castoro, C. Koester, C. L. Wilkins, *Rapid Commun. Mass Spectrom.* 6, 239(1992); C. Koester, J. A. Castoro, C. L. Wilkins, *J. Am. Chem. Soc.* 114, 7572(1992); J. Yao, M. Dey, S. J. Pastor, C. L. Wilkins, *Anal. Chem.* 67, 3638(1995); T. Solouki, D. H. Russell, *Proc. Natl. Acad. Sci. USA* 89, 5701(1992); T. Solouki, K. J. Gilling, D. H. Russell, *Anal. Chem.* 66, 1583(1994); V. H. Vartanian, F. Hadjarab, D. A. Laude, *Int. J. Mass Spectrom. Ion Proc.* 151, 157(1995)).

The purpose of the present invention is to provide a means and method for narrowing the kinetic energy distribution of ions produced by pulsed desorption/ionization techniques such as MALDI so that a larger fraction of the ions can be captured in either a Penning or Paul type ion trap. Another purpose of the present invention is to improve the mass range and ability of the mass spectrometer to analyze unknowns over ICR cell dynamic trapping techniques. This will also particularly improve the sensitivity of FTMS and quadrupole ion traps to high m/z ions such as are produced in MALDI.

BRIEF DESCRIPTION OF THE DRAWINGS

A further understanding of the present invention can be obtained by reference to a preferred embodiment set forth in the illustrations of the accompanying drawings. Although the illustrated embodiment is merely exemplary of systems for carrying out the present invention, both the organization and method of operation of the invention, in general, together with further objectives and advantages thereof, may be more easily understood by reference to the drawings and the following description. The drawings are not intended to limit the scope of this invention, which is set forth with particularity in the claims as appended or as subsequently amended, but merely to clarify and exemplify the invention.

For a more complete understanding of the present invention, reference is now made to the following drawings in which.

DETAILED DESCRIPTION OF THE PREFERRED EMBODIMENT

As required, a detailed illustrative embodiment of the present invention is disclosed herein. However, techniques, systems and operating structures in accordance with the present invention may be embodied in a wide variety of forms and modes, some of which may be quite different from those in the disclosed embodiment. Consequently, the specific structural and functional details disclosed herein are merely representative, yet in that regard, they are deemed to afford the best embodiment for purposes of disclosure and to provide a basis for the claims herein which define the scope of the present invention. The following presents a detailed description of a preferred embodiment of the present invention.

Because TOFMS is a pulsed technique, it is most readily applied with pulsed ion sources such as MALDI. While mass spectra are readily produced via MALDI-TOF mass spectrometry, such spectra typically have a relatively low mass resolution. The main reason the mass resolution of such instruments is not higher is that the ions have some initial velocity when they are produced.

To compensate the flight times of the ions for this velocity distribution, one may use a method known as pulsed ion extraction (PIE) (R. S. Brown and J. J. Lennon, *Anal. Chem.* 67 (13), 1998(1995); R. M. Whittal and L. Li, *Anal. Chem.* 67 (13), 1950(1995)). In performing conventional PIE experiments with TOFMS, ions are not accelerated until a set time, t, after ion production has occurred. In cases where PIE is useful, the kinetic energy of the ions is a well defined function of the distance of the ion from the sample surface at time t. For example, in MALDI-TOF, between the time of ion production and time t, the ions drift away from the sample surface according to their initial velocities. As a result, the accelerating electric field applied at time t can be used to "space" and "energy" compensate the flight times of the ions. In this way, all ions of a given mass-to-charge ratio will arrive at the detector essentially simultaneously. This causes an improvement in the mass resolution.

Several references relate to MALDI, TOFMS, and DE. For example, F. Hillenkamp, M. Karas, R. C. Beavis, B. T. Chait, *Anal. Chem.* 63 (24), 1193A(1991); Wei Hang, Pengyuan Yag, Xiaoru Wang, Chenglong Yang, Yongxuan Su, and Benli Huang, *Rapid Comm. Mass Spectrom.* 8, 590(1994); A. N. Verentchikov, W. Ens, K. G. Standing, *Anal. Chem.* 66, 126(1994); J. H. J. Dawson, M. Guilhaus, *Rapid Comm. Mass Spectrom.* 3, 155(1989); M. Guilhaus, *J. Am. Soc. Mass Spectrom.* 5, 588(1994); E. Axelsson, L. Holmlid, *Int. J. Mass Spectrom. Ion Process.* 59, 231(1984); O. A. Mirgorodskaya, et al., *Anal. Chem.* 66, 99(1994); S. M. Michael, B. M. Chien, D. M. Lubman, *Anal. Chem.* 65, 2614(1993); W. C. Wiley, I. H. McLaren, *Rev. Sci. Inst.* 26 (12), 1150(1955).

Figure 1:
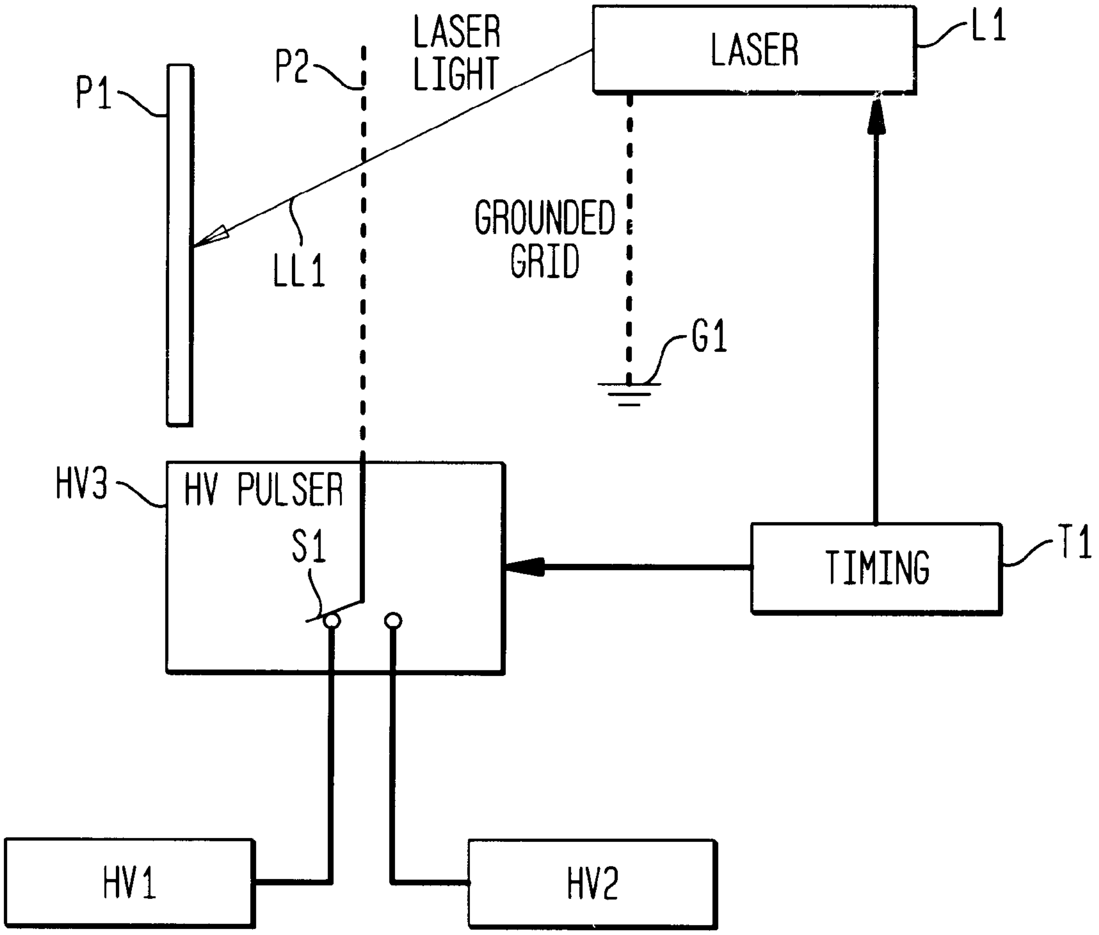
FIG. 1 (PRIOR ART)
FIG. 1 shows a schematic view of a prior art pulsed ion extraction MALDI ion source.

A prior art MALDI-PIE ion source is shown in FIG. 1. Samples are deposited on the surface of a conducting metal plate P1. The plate P1 is held at a potential V1 via power supply HV1. A second plate P2 is positioned adjacent to plate P1 and initially held at a potential V1 via power supply HV1 and high voltage pulser HV3. A third plate, grounded grid G1, is positioned adjacent to plate P2 and held at ground potential throughout the experiment. As an example, the distance between plate P1 and plate P2 could be 3 mm while the distance between plate P2 and grounded grid G1 could be 12 mm. The potential V1 could be, for example, 20 kV assuming one wished to measure positive ions.

To initiate the measurement, laser L1 is triggered. The laser L1 produces a pulse of laser light LL1 directed at the sample, located on plate P1. The laser light LL1 induces the desorption and ionization of sample molecules. At some time, for example 200 ns, after the laser pulse, the timer T1 triggers the high voltage pulser HV3 to switch the potential on plate P2 rapidly to potential V2 as set by power supply HV2. This is accomplished by switch S1 located within high voltage pulser HV3. The potential V2 could be, for example 18 kV assuming the parameters given above.

Therefore, by applying the correct potentials at the correct delay time, one can correct the flight time of the ions through a TOF mass analyzer and thus improve the resolution. However, such prior art PIE does not apply the correct potential gradient to correct the initial kinetic energy distribution of the ions, rather such prior art methods actually broaden the energy distribution. In contrast, the pulsed ion extraction method of this invention uses electric fields of such a strength which are applied at such times that the kinetic energy distribution of ions produced by MALDI or other pulsed desorption ion sources is narrowed.

Figure 2:
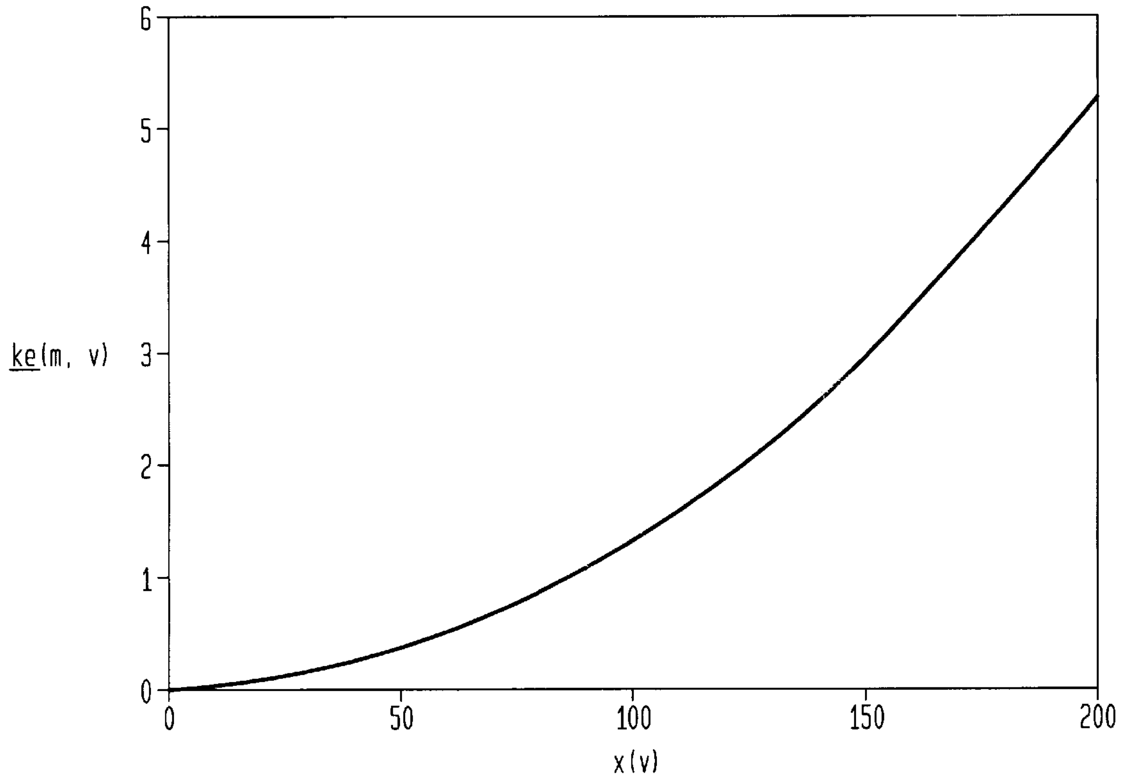
FIG. 2 shows a plot of the initial kinetic energy of MALDI ions versus distance of the ions from the sample surface 200 ns after the desorption event.

Turning next to FIG. 2, shown is this relationship between the initial kinetic energy of 1,000 amu ions produced by MALDI and distance from the sample surface 200 ns after the laser pulse. This relationship is given by:

$$ke=\tfrac{1}{2}m(x/t)^2 \qquad (1)$$

where ke is the ion's kinetic energy, m is the ion's mass, x is the distance between the ion and the sample surface, and t is time after the laser pulse.

Knowing the relationship between kinetic energy, position, and delay time, one can determine the optimum field gradient for narrowing the kinetic energy distribution of the ions. In a first order correction, one would assume a constant field strength throughout the region between plate P1 and plate P2. Upon application of the field, the potential energy of the least energetic ions would equal the sum of the potential and kinetic energies of the most energetic ions of interest. For example, in FIG. 2, the most energetic ion of interest is 0.2 mm from the surface at the time of application of the voltage pulse. Thus the ion has a velocity of 1000 m/s and, assuming a mass of 1 kDa, a kinetic energy of about 5 eV. The field strength, E, is then given by:

$$E=ke/qx_{max}=[\tfrac{1}{2}m(x_{max}/t)^2]/qx_{max}=\tfrac{1}{2}mx_{max}/qt^2 \qquad (2)$$

where q is an elemental charge and $x_{max}$ is the position of the most energetic ion of interest at the time the electric field is applied. The potential difference between potentials V1 and V2 would then be given by:

$$V1-V2=E*d \qquad (3)$$

where d is the distance between plates P1 and P2. And given potential V1, potential V2 can be determined by rearrangement:

$$V2=V1-(E*d) \qquad (4)$$

The total energy per charge, e/q, of the ions at the time the pulse is applied is the sum of kinetic and potential energies:

$$e/q=\tfrac{1}{2}(m/q)(x/t)^2+V1-E*d+E*(d-x) \qquad (5)$$

It is important to note here that potential V1 is a free parameter and can be set to any value without influencing the energy focusing effects of the pulsed ion extraction. Thus, potential V1 could be set to, for example, 5 volts. In this example case, then, the ions which initially had zero eV of kinetic energy would be accelerated through plate P2 and grounded grid G1, and would then have a final kinetic energy of 5 eV. Those ions which initially had a kinetic energy of 5 eV would now have a potential energy of zero eV upon application of the pulse. Therefore, these ions would also have final kinetic energy of 5 eV after having been accelerated through plate P2 and grounded grid G1.

Figure 3:
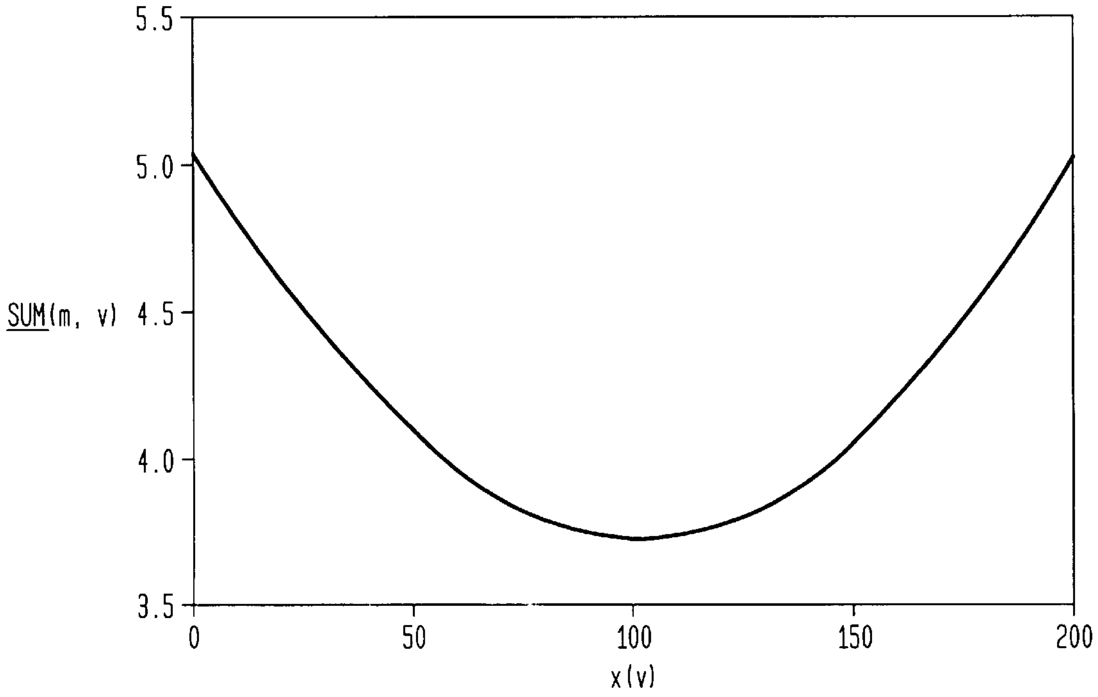
FIG. 3 shows a plot of the total energy of the ions of FIG. 2 as a function of distance of the ions from the sample surface at the time the extraction pulse is applied.

Lastly, turning to FIG. 3, illustrated is a plot of the final kinetic energy of the ions as a function of their position at the time of application of the extraction pulse—i.e., 200 ns after the laser pulse. Whereas the ions have an initial kinetic energy distribution of about 5 eV, their final kinetic energy distribution—after pulsed ion extraction according to the present invention—is about 1.3 eV.

Further, ions produced in such a source may be injected into the trap of either a FTICR or quadrupole mass spectrometer. Because ions produced in a source according to the present invention have a reduced kinetic energy distribution, a larger fraction of the ions can be trapped in a Penning (for FTICR-MS) or Paul (for quadrupole ion trap MS) ion trap.

While the present invention has been described with reference to one or more preferred embodiments, such embodiments are merely exemplary and are not intended to be limiting or represent an exhaustive enumeration of all aspects of the invention. The scope of the invention, therefore, shall be defined solely by the following claims. Further, it will be apparent to those of skill in the art that numerous changes may be made in such details without departing from the spirit and the principles of the invention.

What is claimed is:

1. A method for producing ions with a reduced kinetic energy distribution via a pulsed desorption/ionization technique, wherein said method comprises the following steps:

depositing a sample material on a first conducting plate;

placing a second conducting plate proximate to said first conducting plate;

maintaining a first potential difference between said first and second conducting plates;

stimulating said sample material such that a pulse of ions is produced; and after said sample material has been stimulated, varying with time the potential difference between said first and second conducting plates such that the kinetic energy distribution of said ions is reduced.

2. A method according to claim 1, wherein said method comprises the further step of:

placing additional conducting plates proximate to said second conducting plate.

3. A method according to claim 1, wherein said sample material consists of analyte dissolved in a solid matrix material.

4. A method according to claim 1, wherein said sample material consists of analyte dissolved in a liquid matrix material.

5. A method according to claim 1, wherein said sample material is covalently or non-covalently bound directly or indirectly to the surface of said first conducting plate.

6. A method according to claim 1, wherein one or more of the conducting plates take the form of apertured plates.

7. A method according to claim 1, wherein one or more of the conducting plates take the form of conducting grids.

8. A method according to claim 1, wherein said first potential difference is non-zero.

9. A method according to claim 1, wherein said first potential difference is zero.

10. A method according to claim 1, wherein said sample material is stimulated by a pulse of laser light.

11. A method according to claim 1, wherein said sample material is stimulated by a pulsed electron beam.

12. A method according to claim 1, wherein said sample material is stimulated by a pulsed ion beam.

13. A method according to claim 1, wherein said potential difference between said first and said second conducting plates is varied as a simple square pulse.

14. A method according to claim 13, wherein the magnitude of said simple square pulse and time of its application is determined prior to the experiment by:

establishing a relationship between ion position and ion kinetic energy;

using said relationship between position and kinetic energy to determine a relationship between the pulse voltage, and pulse time;

selecting a value for one of either said pulse voltage or said pulse time, and calculating the other via the said relationship;

applying said calculated pulse voltage at said calculated pulse time to reduce the kinetic energy distribution of the ions; and adjusting one or both of said pulse voltage and said pulse time to minimize the kinetic energy distribution, as determined by the mass analyzer.

15. A mass spectrometer comprising:

sample material is deposited on a first conducting plate;

at least one additional conducting plate is placed proximate to said first conducting plate;

a first potential is maintained between said first and second conducting plates;

sample material is stimulated so as to produce a pulse of ions;

after said sample material is stimulated, the potential difference between said two conducting plates is varied with time so as to reduce the kinetic energy distribution of the ions;

an ion trap is used to trap and mass analyze ions produced in the ion source;

a detector is used to detect ions; and and supporting hardware and electronics are used to control said source, trap, and detector, and to record and analyze detector signals.

16. A mass spectrometer according to claim 15, wherein the sample material consists of analyte dissolved in a solid matrix material.

17. A mass spectrometer according to claim 15, wherein the sample material consists of analyte dissolved in a liquid matrix material.

18. A mass spectrometer according to claim 15, wherein the sample material is covalently or non-covalently bound directly or indirectly to the surface of said first conducting plate.

19. A mass spectrometer according to claim 15, wherein one or more of the conducting plates take the form of apertured plates.

20. A mass spectrometer according to claim 15, wherein one or more of the conducting plates take the form of conducting grids.

21. A mass spectrometer according to claim 15, wherein the first potential difference is non-zero.

22. A mass spectrometer according to claim 15, wherein the first potential difference is zero.

23. A mass spectrometer according to claim 15, wherein the sample is stimulated by a pulse of laser light.

24. A mass spectrometer according to claim 15, wherein the sample is stimulated by a pulsed electron beam.

25. A mass spectrometer according to claim 15, wherein the sample is stimulated by a pulsed ion beam.

26. A mass spectrometer according to claim 15, wherein the potential difference between the two said conducting plates is varied as a simple square pulse.

27. A mass spectrometer according to claim 26, wherein the magnitude of the potential pulse and time of its application is determined prior to the experiment by:

establishing a relationship between ion position and ion kinetic energy;

using said relationship between position and kinetic energy to determine a relationship between the pulse voltage, and pulse time;

selecting a value for one of either said pulse voltage or said pulse time, and calculating the other via the said relationship;

applying said calculated pulse voltage at said calculated pulse time to reduce the kinetic energy distribution of the ions; and adjusting one or both of said pulse voltage and said pulse time to minimize the kinetic energy distribution, as determined by the mass analyzer.

28. A mass spectrometer according to claim 15, wherein said ion trap is a Penning type trap.

29. A mass spectrometer according to claim 28, wherein ions are detected via induction at detection electrodes.

30. A mass spectrometer according to claim 15, wherein said ion trap is a Paul (or quadrupole) type ion trap.

31. A mass spectrometer according to claim 30, wherein ions are detected via collision of the ions with an electron multiplier.

* * * * *